United States Patent
Bertea (10) Patent No.: US 8,998,492 B2
(45) Date of Patent: Apr. 7, 2015

(54) BEARING ASSEMBLY FOR A MARINE TURBINE SHAFT, AND MARINE TURBINE INCLUDING SUCH A BEARING ASSEMBLY

(75) Inventor: Jean-François Bertea, Saint Jean de Muzols (FR)

(73) Assignee: Alstom Renewable Technologies, Grenoble (FR)

( * ) Notice: Subject to any disclaimer, the term of this patent is extended or adjusted under 35 U.S.C. 154(b) by 0 days.

(21) Appl. No.: 13/992,402

(22) PCT Filed: Dec. 9, 2010

(86) PCT No.: PCT/FR2010/052660
§ 371 (c)(1),
(2), (4) Date: Aug. 2, 2013

(87) PCT Pub. No.: WO2012/076762
PCT Pub. Date: Jun. 14, 2012

(65) Prior Publication Data
US 2013/0315516 A1    Nov. 28, 2013

(51) Int. Cl.
*F16C 17/04*   (2006.01)
*F16C 33/02*   (2006.01)
*F03B 11/06*   (2006.01)
*F16C 17/14*   (2006.01)

(52) U.S. Cl.
CPC ............... *F16C 17/04* (2013.01); *F03B 11/06* (2013.01); *F16C 17/14* (2013.01); *F16C 2300/14* (2013.01); *F16C 33/02* (2013.01)

(58) Field of Classification Search
CPC .......... F03B 11/06; F16C 17/04; F16C 17/14; F16C 33/02; F16C 2300/14; B63H 23/322; B23H 23/326

USPC ............... 384/97, 99, 103, 119, 302, 306
See application file for complete search history.

(56) References Cited

U.S. PATENT DOCUMENTS

| 4,544,285 | A | * | 10/1985 | Shapiro et al. | 384/99 |
| 5,078,628 | A | * | 1/1992 | Garis, Jr. | 440/6 |
| 5,185,545 | A | * | 2/1993 | Veronesi et al. | 310/114 |
| 5,205,653 | A | * | 4/1993 | Veronesi et al. | 384/306 |

(Continued)

FOREIGN PATENT DOCUMENTS

| DE | 10 2008 023050 A1 | 11/2009 | |
| EP | 0 511 772 A2 | 11/1992 | |
| EP | 0566788 A1 * | 10/1993 | B63H 1/16 |

(Continued)

OTHER PUBLICATIONS

International Search Report dated Sep. 5, 2011 for International Patent Application No. PCT/FR2010/052660.

*Primary Examiner* — Marcus Charles
(74) *Attorney, Agent, or Firm* — Buchanan Ingersoll & Rooney PC (57) ABSTRACT

To recover the axial forces transmitted by a rotating shaft, a bearing assembly includes a plurality of distributed bearing units. Each bearing unit comprises: a stationary base; a resilient member having a stationary portion and a portion that is completely movable in a main direction of the forces to be supported; and a bearing surface that defines, together with the shaft, a water film. The bearing surface is connected to the movable portion. The minimum radius of the bearing surface is between 1 m and 3 m. The resilient member and the base define at least one water chamber. A plurality of ducts are arranged so as to connect the chambers together, thereby defining a closed circuit.

19 Claims, 6 Drawing Sheets

(56) References Cited

U.S. PATENT DOCUMENTS

| | | | |
|---|---|---|---|
| 5,220,231 A * | 6/1993 | Veronesi et al. | 310/90 |
| 7,845,995 B2 * | 12/2010 | Taylor et al. | 440/38 |
| 2006/0063442 A1 | 3/2006 | Taylor et al. | |

FOREIGN PATENT DOCUMENTS

| | | | | |
|---|---|---|---|---|
| FR | 2 304 819 A1 | | 10/1976 | |
| GB | 1498241 A | * | 1/1978 | E21B 4/02 |
| JP | 05162687 A | * | 6/1993 | B63G 8/08 |

* cited by examiner

BEARING ASSEMBLY FOR A MARINE TURBINE SHAFT, AND MARINE TURBINE INCLUDING SUCH A BEARING ASSEMBLY

CROSS REFERENCE TO RELATED APPLICATIONS

This application is the U.S. National Phase of International Application No. PCT/FR2010/052660, filed Dec. 9, 2010, designating the U.S. and published as WO/2012/076762 on Jun. 14, 2012.

FIELD OF THE INVENTION

The present invention relates to a bearing assembly for supporting a rotating marine turbine shaft, i.e. for absorbing the axial forces exerted by the shaft. Moreover, the present invention relates to a marine turbine comprising a rotatable shaft, and such a bearing assembly. In particular, the present invention may be applied to a marine turbine installed in an engine fluid flow suitable for circulating in either direction.

BACKGROUND OF THE INVENTION

A hydraulic turbine according to the prior art generally comprises a shaft of approximately 1 m in diameter and a bearing assembly immersed in oil to support the rotating shaft. In particular, to absorb the radial forces exerted by the shaft, a plurality of bearing units are distributed about the axis of rotation. The bearing units generally comprise a stationary base, a resilient member and a bearing surface defining, together with the shaft, an oil film approximately 0.5 mm thick.

The function of the bearing units and the oil film is that of limiting bumping of the shaft on the bearing surfaces. This bumping is particularly caused by assembly defects of relatively moving parts and geometric defects due to manufacturing tolerances of relatively moving parts. In the standard case whereby the shaft has a diameter of approximately 1 m and the oil film is approximately 0.5 mm thick, the bearing assembly adapts well to assembly defects and geometric defects which are relatively minor.

However, such a bearing assembly according to the prior art is not suitable for effectively limiting marine turbine shaft bumping. Indeed, the compressibility of the oil gives rise to inertia liable to slow down the reactions of the bearing assembly. However, the large diameter of a marine turbine shaft gives rise to relatively significant and numerous assembly defects and geometric defects, requiring a bearing assembly reacting very rapidly to shaft oscillations. Moreover, immersing a marine turbine bearing assembly in oil gives rise to a pollution risk for the environment in which the marine turbine is placed.

SUMMARY OF THE INVENTION

One of the aims of the present invention is that of remedying these drawbacks, particularly by proposing a quick-reacting and oil-free bearing assembly.

In this aim, the present invention relates to a bearing assembly for absorbing the axial forces transmitted by a rotating marine turbine shaft about an axis of rotation, the bearing assembly comprising a plurality of bearing units distributed about the axis of rotation, each bearing unit comprising:

a stationary base;
a resilient member having a stationary portion rigidly connected to the base and a portion that is generally movable in a main direction of the forces to be supported;
a bearing surface suitable for defining, together with the shaft, a volume for receiving a liquid film, the bearing surface being connected to the movable portion of the resilient member.

The bearing assembly is characterised in that the liquid film is a water film, in that the minimum radius of the bearing surface is between 1 m and 3 m, in that the resilient member and the base define at least one chamber containing water, the surfaces of the resilient member and the base in contact with water comprising a rustproof material and in that the bearing assembly further comprises a plurality of ducts suitable for circulating water, each duct being arranged so as to connect at least two chambers together, the ducts and the chambers defining a closed circuit extending about the axis of rotation.

In other words, water, which is a liquid with a very low compressibility, damps the backlash due to assembly defects and geometric defects of relatively moving parts. The bearing units are connected by a water circuit enabling a quick reaction.

According to further advantageous, but optional, features of the present invention, taken alone or in any technically feasible combination:

the movable portion moves generally in a parallel direction with respect to the axis of rotation and in that the or each bearing surface is perpendicular to the axis of rotation;
a bearing surface is linked to a single movable portion;
a bearing surface is linked to a plurality of movable portions belonging to a plurality of bearing units respectively;
the bearing surface comprises a material having a hardness greater than 800 Hv such as a ceramic material;
the base comprises a plate having a generally annular shape and in that each duct is formed by holes extending in the base;
the resilient member forms a resiliently deformable membrane;
each chamber comprises a portion having a generally toroid shape optionally having a circular cross-section;
the resilient member comprises a thin plate;
the resilient member comprises a thick part;
at least one bearing unit comprises a partially spherical projection so as to form a point connection between the resilient member and the base;
the bearing assembly comprises between 10 and 20 bearing units, preferably 16.

Moreover, the present invention relates to a marine turbine comprising a turbine equipped with a rotatable shaft about an axis of rotation, the marine turbine being characterised in that it comprises at least one bearing assembly as described above.

According to further advantageous, but optional, features of the present invention, taken alone or in any technically feasible combination:

the water film is less than 0.10 mm thick, preferably less than 0.06 mm;
the marine turbine comprises two bearing assemblies as described above, the two bearing assemblies being coaxial with the axis of rotation, the two bearing assemblies being situated at a distance from each other so as to define a housing for a shaft flange.

BRIEF DESCRIPTION OF DRAWINGS

The present invention will be understood clearly and the advantages thereof will also emerge in the light of the description hereinafter, given merely as a non-limiting example with reference to the appended figures, wherein.

DETAILED DESCRIPTION OF THE EMBODIMENTS

Figure 1A:
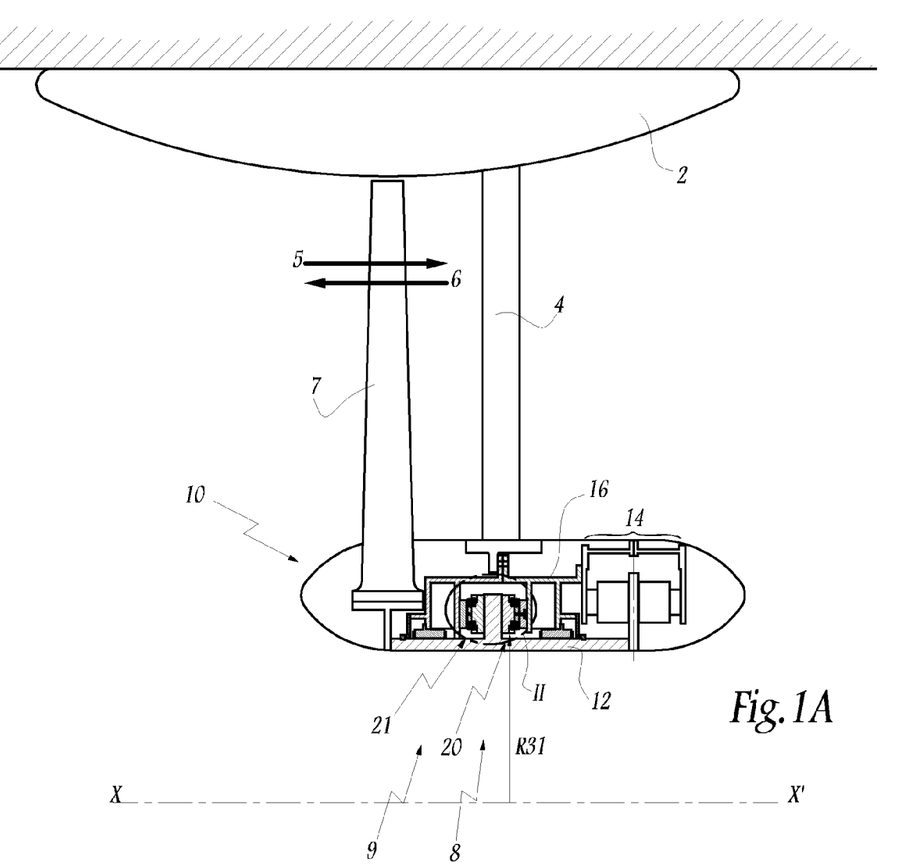
FIG. 1A is an axial half-section of a marine turbine according to the invention and comprising a bearing assembly according to a first embodiment of the invention.
Figure 1B:
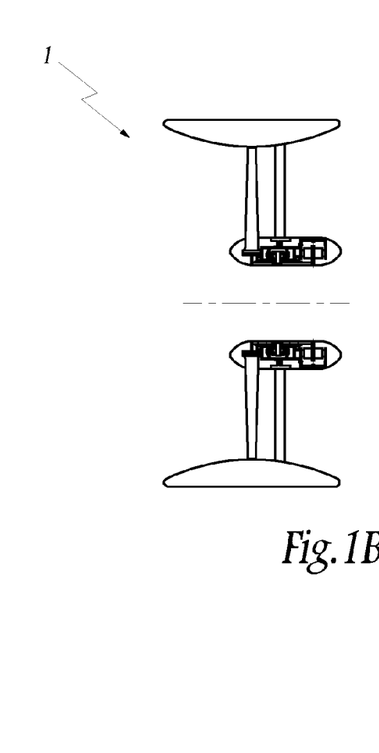
FIG. 1B is a full section of the marine turbine in FIG. 1A.
Figure 2:
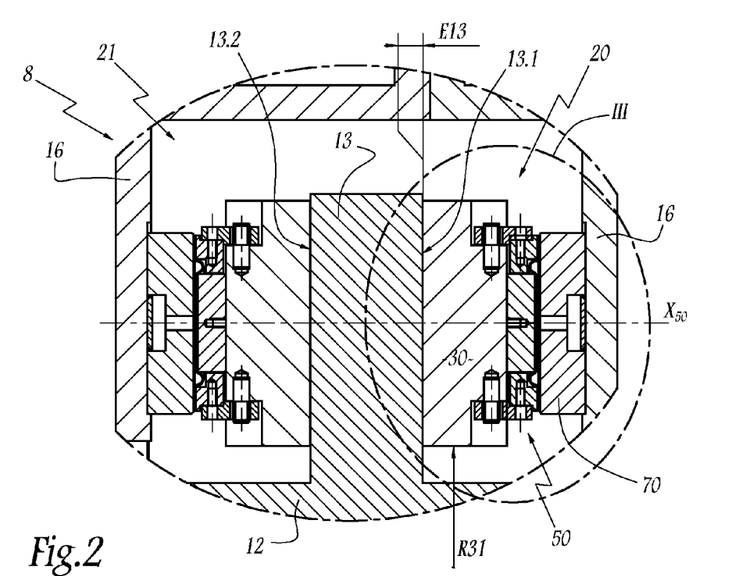
FIG. 2 is a larger scale view of detail II in FIG. 1A.

FIGS. 1A and 1B show a marine turbine 1 comprising a band 2, stay vanes 4, blades 7 and a hub 10. The band 2 is generally annular in shape and is connected to the ground by a gravitational base, said structure consisting of a base plate and a plurality of posts.

The hub 10 is attached to the band 2 via stay vanes 4. The hub 10 comprises a shaft 12, an electric power generator 14 and a supporting member 16. The shaft 12 is rotatable about an axis of rotation X-X'. The shaft 12 comprises a flange 13 which is integral and made of one-piece with the shaft 12. The radial surfaces 13.1 and 13.2 of the flange 13 have a flat ring shape.

The blades 7 are attached to one of the ends of the shaft 12. The blades 7 are rotated about the axis X-X' by a water flow in the band 2, either in one direction indicated by an arrow 5, or in the other direction indicated by an arrow 6.

The stay vanes 4 and the blades 7 extend generally in radial directions and are distributed about the axis X-X'. The shaft 12, the hub 10, the generator 14, the supporting member 16 and the band 2 each have a revolution symmetry about the axis X-X'.

In the present application, the term "axial" denotes either a parallel direction with respect to the axis of rotation X-X', or a generally perpendicular surface with respect to the rotation axis X-X'. In the present application, the term "radial" denotes either a perpendicular direction with respect to the axis of rotation X-X', or a perpendicular surface with respect to such a radial direction. The term "circumferential" denotes a tangential direction C-C', not secant with respect to the axis of rotation X-X'.

The hub 10 also comprises two bearing assemblies 8 and 9 for supporting the shaft 12, specifically for absorbing the axial forces. In practice, the bearing assembly 8 is referred as a "thrust bearing" and the bearing assembly 9 is referred to as a "counter thrust bearing".

The bearing assemblies 8 and 9 are coaxial with respect to the axis X-X'. The bearing assemblies 8 and 9 are situated at a distance from each other so as to define a housing for the flange 13. Insofar as the bearing assembly 9 is identical or similar to the bearing assembly 8, the description of the bearing assembly 8 given hereinafter can be transposed to the bearing assembly 9.

As shown in FIGS. 1A to 5, the bearing assembly 8 comprises a plurality of bearing units 20, 20.1, 20.2 and equivalents distributed about the axis X-X'. The bearing assembly 8 comprises 16 bearing units 20, 20.1, 20.2 and equivalents. Each bearing unit 20, 20.1, 20.2 and equivalents comprises a base 70, a resilient member 50 and a bearing surface 31. The base 70 is attached to the supporting member 16, by screwing, welding, embedding or other equivalent means.

Figure 3:
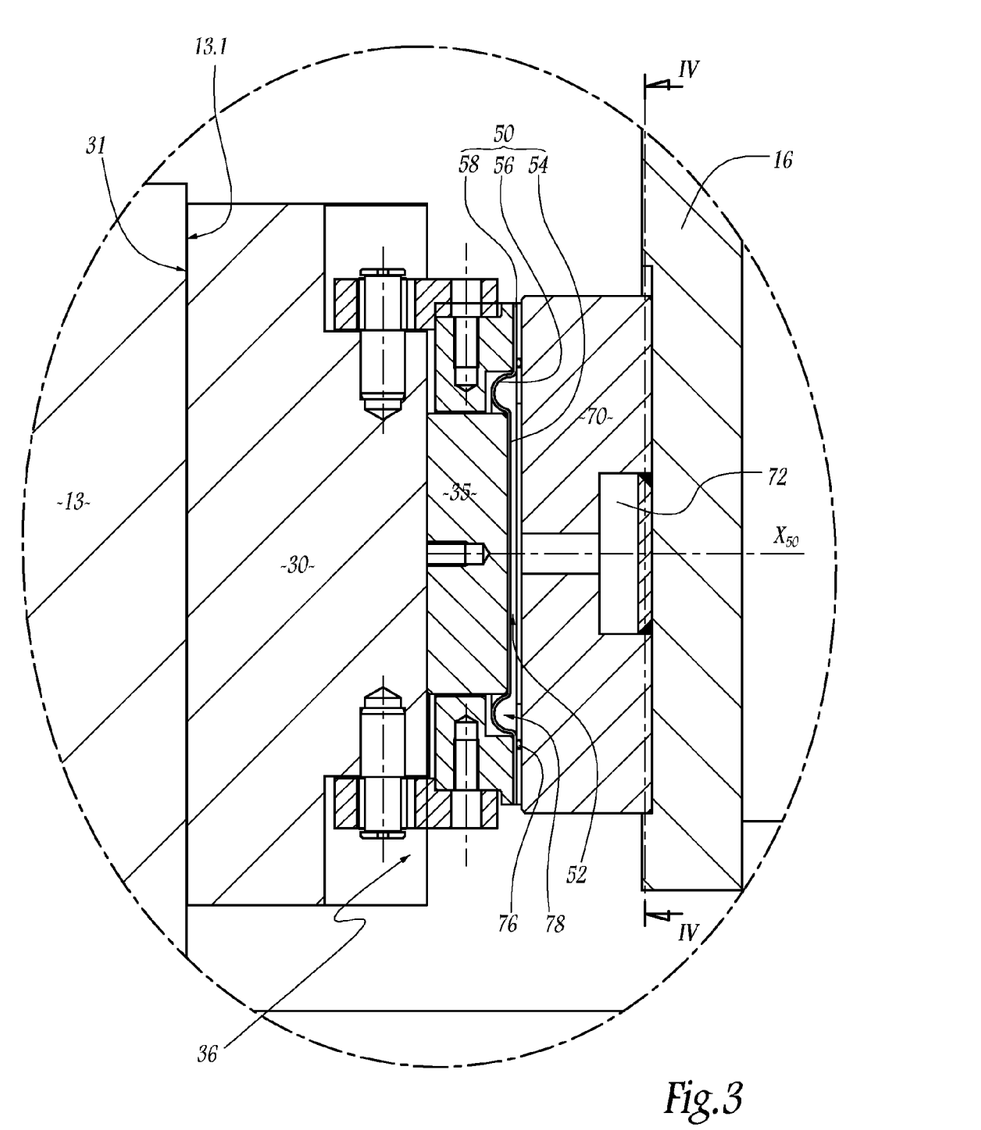
FIG. 3 is a larger scale view of detail III in FIG. 1A.
Figure 6:
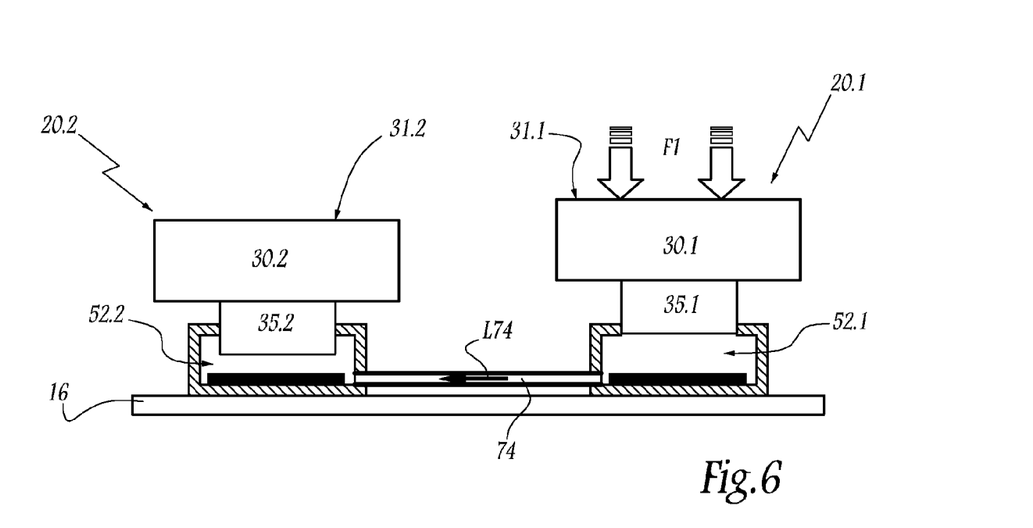
FIG. 6 is a schematic view illustrating a first state of the bearing assembly in FIGS. 1A to 5.
Figure 7:
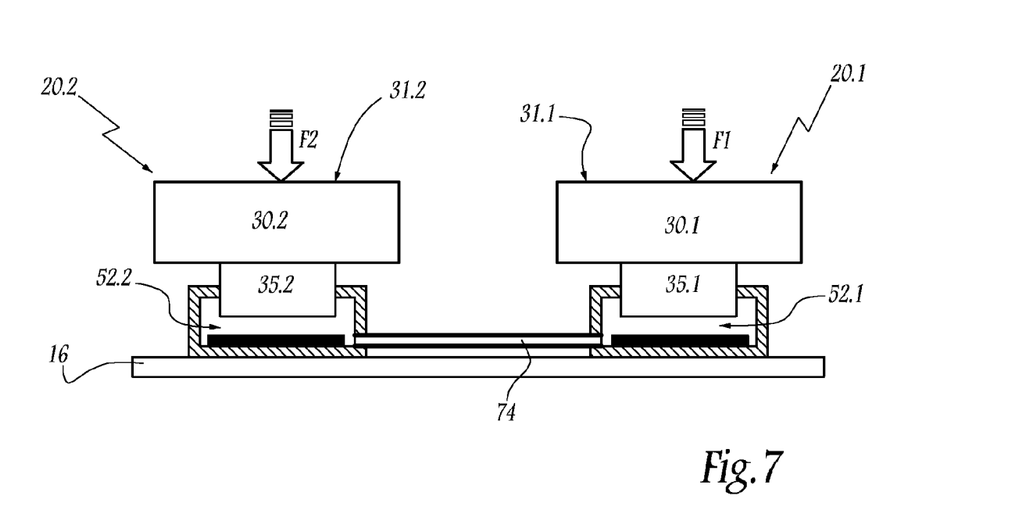
FIG. 7 is a schematic view similar to FIG. 6 illustrating a second state of the bearing assembly in FIGS. 1A to 5.

As shown in FIG. 3, the resilient member 50 forms a resiliently deformable membrane which has a stationary portion 58 rigidly connected to the base 70 and a portion 54 that is generally movable in an axial direction X50. The axial direction X50 is the main direction of the forces to be supported, which are represented in FIGS. 6 and 7 with the references F1 and F2.

The bearing surface 31 is in this case in the form of a flat ring and perpendicular to the axis X-X'. The function of the bearing surface 31 is that of supporting the rotating shaft 12. The bearing surface 31 is suitable for defining, together with the shaft 12, a volume for receiving a liquid film.

The liquid film contained in this thin receiving volume may thus form a hydrodynamic bearing for the rotating shaft 12. The liquid film is a water film wherein the thickness E13 is less than 0.10 mm, preferably less than 0.06 mm. The water forming this lubricant film may be sourced from the water flow driving the blades 7.

In other words, the bearing surface 31 and the radial surface 13.1 of the flange 13 are substantially coincident and separated by a functional gap. As shown in FIG. 1A, the minimum radius R31 of the bearing surface 31 is equivalent to half the diameter D12 of the shaft 12. The radius R31 of the bearing surface 31 is between 1 m and 3 m. Therefore, the diameter D12 is between 2 m and 6 m.

The bearing surface 31 and/or the radial surface 13.1 of the flange 13 comprises a material having a hardness greater than 800 Hv (Vickers) such as a ceramic material, for example dichromium trioxide or chromium (III) oxide ($Cr_2O_3$). Such a material significantly limits the wear of the bearing surface 31 and/or the radial surface 13.1. Any other material of equivalent hardness may be used instead of a ceramic.

The resilient member 50 comprises a thin plate, for example a stainless steel sheet, having a revolution symmetry about the axis X50. The thin plate renders the resilient member 50 relatively compact. The membrane forming the resilient member 50 thus has the overall shape of a disk. The stationary portion 58 thereof is formed by the flat peripheral ring and the movable portion 54 thereof is formed by a central disk. A projection 56 generally in the shape of a toroid having a semi-circular section is situated between the stationary portion 58 and the movable portion 54. The projection 56 enables the resilient deformation of the resilient member 50.

The bearing surface 31 is linked to the movable portion 54 of the resilient member 50. In the present application, the verb "link" implies a kinematic link or a rigid link. In this case, the bearing surface 31 is defined by a pad 30 wherein a base plate 35 bears on the movable portion 54. The pad 30 and the base plate 35 are attached by attachment means 36 comprising a clamp and screws. Specifically, each bearing surface 31 is linked to a single movable portion 54. In other words, the bearing units 20 are independent.

The resilient member 50 and the base 70 define a chamber 52 containing water. The chamber 52 comprises a portion which is generally toroid in shape with a semi-circular section since it is defined by the projection 56. The surfaces of the resilient member 50 and the base 70 in contact with water comprise a rustproof material, throughout or on the surface coating, in particularly those of the surfaces defining the chamber 52.

The base 70 comprises a flexible washer 76 and an O-ring 78 made of a resilient material such as a rubber or elastomer. The washer 76 and the O-ring 78 are compressed between the stationary portion 58 and the base 70 to render the chamber 52 relatively tight.

Figure 4:
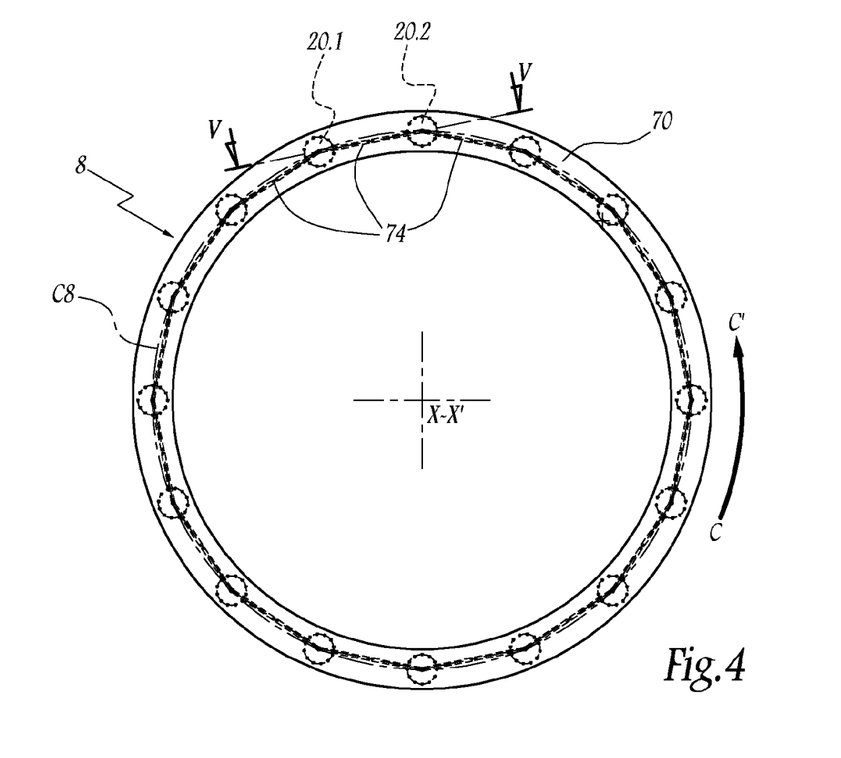
FIG. 4 is a cross-section, along the line IV-IV in FIG. 3.
Figure 5:
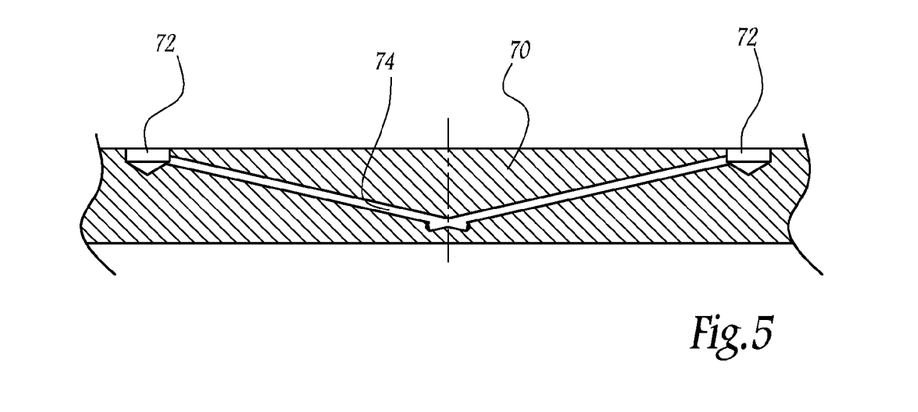
FIG. 5 is a cross-section, along the line V-V in FIG. 4.

As shown in FIGS. 4 and 5, the bearing assembly 8 further comprises a plurality of ducts 74 suitable for circulating water. Each duct 74 is arranged so as to connect at least two chambers 52.1 and 52.2 together at a respective groove 72. Each groove 72 has a T-shaped cross-section. The ducts 74 connect all the chambers 52, such that the ducts 74 and the chambers 52 define a closed circuit extending about the axis X-X'. In the present application, the verb "connect" implies a liquid connection, particularly water.

The base 70 particularly consists of a seat plate having a generally annular shape. Each duct 74 consists of two convergent and oblique blind holes extending into the base 70. Water can thus flow into the ducts 74 and between two successive chambers 52.1 and 52.2 in the circumferential direction C-C'. In other words, the hydraulic pressure may be transmitted by the ducts 74 between the chambers 52, tending to balance the water pressures reigning in the chambers 52.

As shown in FIGS. 6 and 7, in a first state, the flange 13 applies pressure forces, represented by arrows F1 in FIG. 6, on the bearing surface 31.1 of the pad 30.1 and via the water film E13. In this first state, the pressure is not uniformly distributed between the bearing units 52.

The base plate 35.1 thus bears on the corresponding movable portion 54. This movable portion 54 approaches the base 70 and compresses the water contained in the chamber 52.1. A water flow then circulates from the chamber 52.1 to the adjacent chambers including the chamber 52.2, which is represented by an arrow L74 in FIG. 4.

This water flow balances the pressures reigning in the water contained in the various chambers 52. In the second state illustrated in FIG. 7, the bearing surfaces 31.1 and 31.2 absorb the equivalent forces F1 and F2. In this second state, all the bearing units 20, 20.1 and 20.2 are balanced. The bearing assembly 8 thus compensates for the geometric defects and assembly defects of the relatively moving parts.

Figure 8:
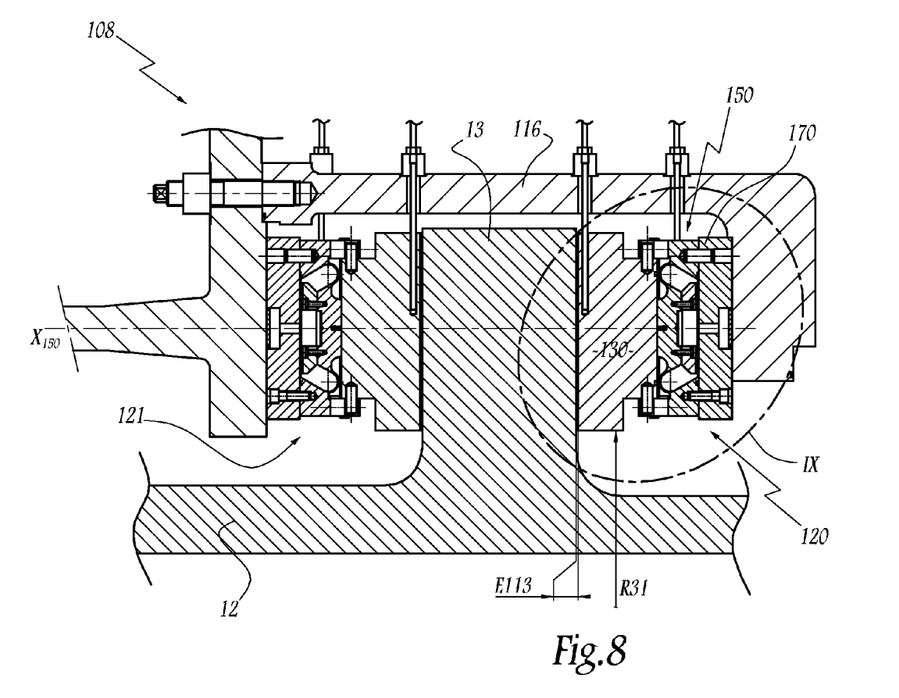
FIG. 8 is a view similar to FIG. 2 of a bearing element according to a second embodiment of the invention.
Figure 9:
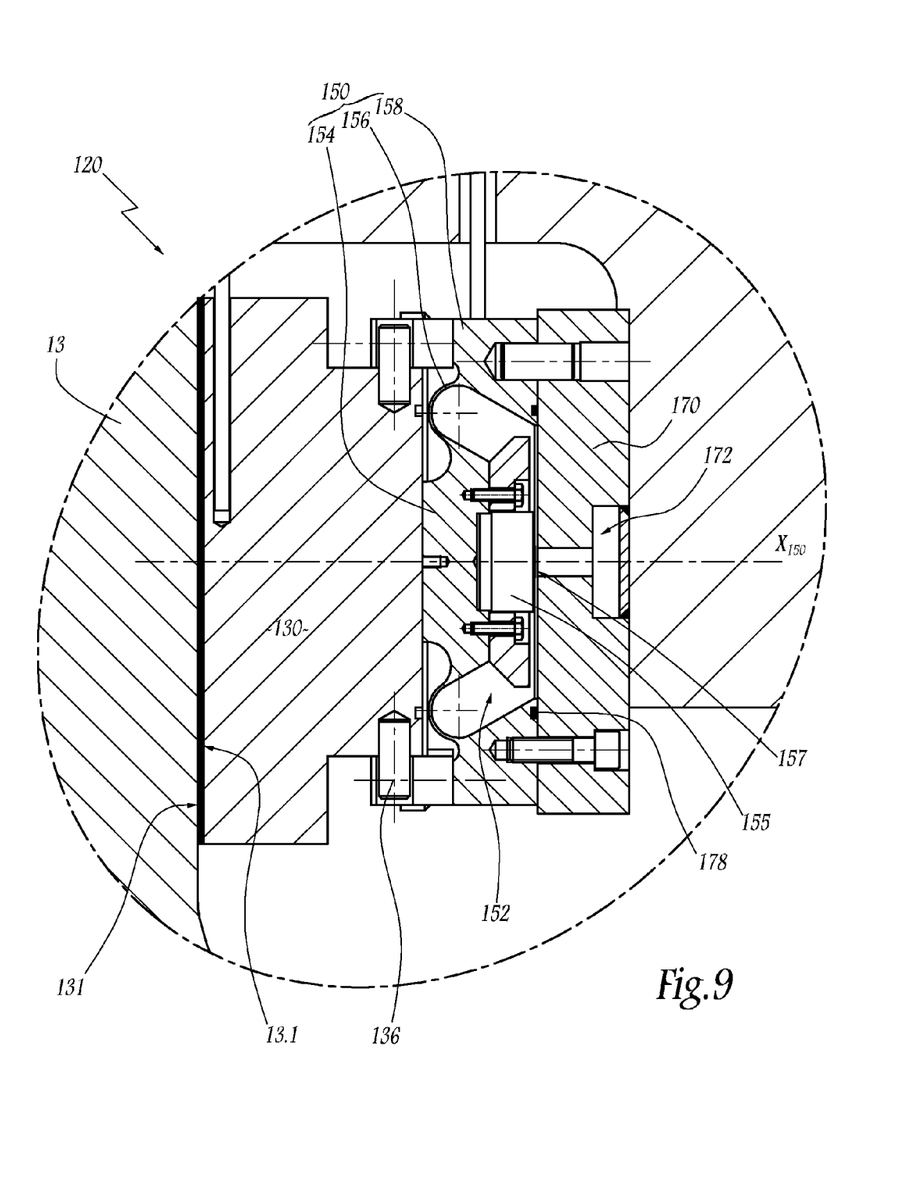
FIG. 9 is a view similar to FIG. 3 of the bearing element in FIG. 8.

FIGS. 8 and 9 show a bearing assembly 108 according to a second embodiment of the invention. The bearing assembly 108 is similar to the bearing assembly 8. The description of the bearing assembly given above in relation to FIGS. 1A to 7 can be transposed to the bearing assembly 108 in FIGS. 8 and 9, apart from the differences mentioned hereinafter.

An entity of the bearing assembly 108 which is identical or corresponding to an entity of the bearing assembly 8 bears the same reference number increased by 100. In this way, a bearing assembly 108, a water film thickness E113, a stationary supporting member 116, a bearing unit 120, a pad 130, a bearing surface 131, attachment means 36, a minimum radius R151, a resilient member 150, an axis X150, a chamber 152, a movable portion 54, a projection 156, a stationary portion 158, a base 170, a groove 172 and an O-ring 178.

The bearing assembly 108 differs from the bearing assembly 8 in that the resilient member 150 comprises a thick part forming the movable portion 154 and the stationary portion 158 connected by the projection 156. The movable portion 154 and the stationary portion 158 are thus thicker than the movable portion 54 and the stationary portion 58, respectively. This makes it possible to support greater loads if required.

The resilient member 150 and the base 170 consist of or are coated with a rustproof material, such that the surfaces of the resilient member 150 and the base 170 in contact with water comprise a rustproof material to withstand corrosion by the water contained in the chamber 152.

Moreover, the bearing assembly 108 differs from the bearing assembly 8 in that at least one bearing unit 120 comprises a thrust bearing 155 rigidly connected to the movable portion 154. The thrust bearing 155 comprises a partially spherical projection 157. The projection 157 forms a ball-joint point connection between the resilient member 150 and the base 170. The function of the thrust bearing 155 and the projection 157 is that of limiting the travel of the movable portion 154 to limit the mechanical stress applied to the projection 156 following the resilient deformations thereof.

Moreover, the base 170 merely comprises the O-ring 178 to render the chamber 152 relatively tight, but not a washer such as 76. Indeed, the tightness of the chamber 152 is also ensured by fastening the stationary portion 174 on the base 170 by means of screws and by adjusted machining of the surfaces in contact with the stationary portion 174 and the base 170.

According to further embodiments of the invention not shown:
 instead of a flange 13 integral with the shaft 12, the flange may be made of two parts, for example two half-flanges which are axially juxtaposed and/or mounted on the shaft;
 the bearing assembly comprises between 10 and 20 bearing units such as 20, 21;
 the same bearing surface is connected to a plurality of movable portions belonging to a plurality of bearing units, respectively; in other words, the pad is common to all the resilient members; in particular, the same bearing surface is connected to all the movable portions.

What is claimed is:

1. A bearing assembly for absorbing axial force transmitted by a rotating marine turbine shaft about an axis of rotation, the bearing assembly comprising a plurality of bearing units distributed about the axis of rotation, each bearing unit comprising:
 a stationary base;
 a resilient member having a stationary portion rigidly connected to the base and a portion that is generally movable in a main direction of the forces to be supported;
 a bearing surface suitable for defining, together with the shaft, a volume for receiving a liquid film, the bearing surface being connected to the movable portion of the resilient member, wherein the liquid film is a water film, a minimum radius of the bearing surface is between 1 m and 3 m, the resilient member and the stationary base define at least one chamber containing water, surfaces of the resilient member and the base in contact with water comprising a rustproof material, and
 the bearing assembly further comprises a plurality of ducts configured for circulating water, each duct being arranged so as to connect at least two chambers together, the ducts and the chambers defining a closed circuit extending about the axis of rotation.

2. The bearing assembly according to claim 1, wherein the movable portion moves generally in a parallel direction with respect to the axis of rotation and the bearing surface is perpendicular to the axis of rotation.

3. The bearing assembly according to claim 1, wherein the bearing surface is linked to a single movable portion.

4. The bearing assembly according to claim 1, wherein the bearing surface is linked to a plurality of movable portions belonging to a plurality of bearing units respectively.

5. The bearing assembly according to claim 1, wherein the bearing surface comprises a material having a hardness greater than 800 Hv.

6. The bearing assembly according to claim 5, wherein the bearing surface comprises a ceramic material.

7. The bearing assembly according to claim 1, wherein the base comprises a plate having a generally annular shape and in that each duct is formed by holes extending in the base.

8. The bearing assembly according to claim 1, wherein the resilient member forms a resiliently deformable membrane.

9. The bearing assembly according to claim 1, wherein each chamber comprises a portion having a generally toroid shape optionally having a circular cross-section.

10. The bearing assembly according to claim 1, wherein the resilient member comprises a plate consisting of a sheet.

11. The bearing assembly according to claim 10, wherein the resilient member comprises a stainless steel sheet.

12. The bearing assembly claim 1, wherein the resilient member comprises a part forming the movable portion and the stationary portion.

13. The bearing assembly according to claim 12, wherein at least one bearing unit comprises a partially spherical projection so as to form a point connection between the resilient member and the base.

14. The bearing assembly according to claim 1, comprising:

between 10 and 20 bearing units.

15. The bearing assembly according to claim 14, comprising:

16 bearing units.

16. A marine turbine comprising:

at least one bearing assembly according to claim 1; and a turbine equipped with the rotatable shaft about the axis of rotation.

17. The marine turbine according to claim 16, wherein the water film has a thickness of less than 0.10 mm.

18. The marine turbine according to claim 17, wherein the water film has a thickness of less than 0.06 mm.

19. The marine turbine according to claim 16, comprising:

two bearing assemblies, the two bearing assemblies being coaxial with the axis of rotation, the two bearing assemblies being situated at a distance from each other so as to define a housing for a shaft flange.

* * * * *